July 14, 1942. J. HACKWORTH 2,289,705
DISPENSING AND WEIGHING MACHINE
Filed Nov. 13, 1939 2 Sheets-Sheet 1
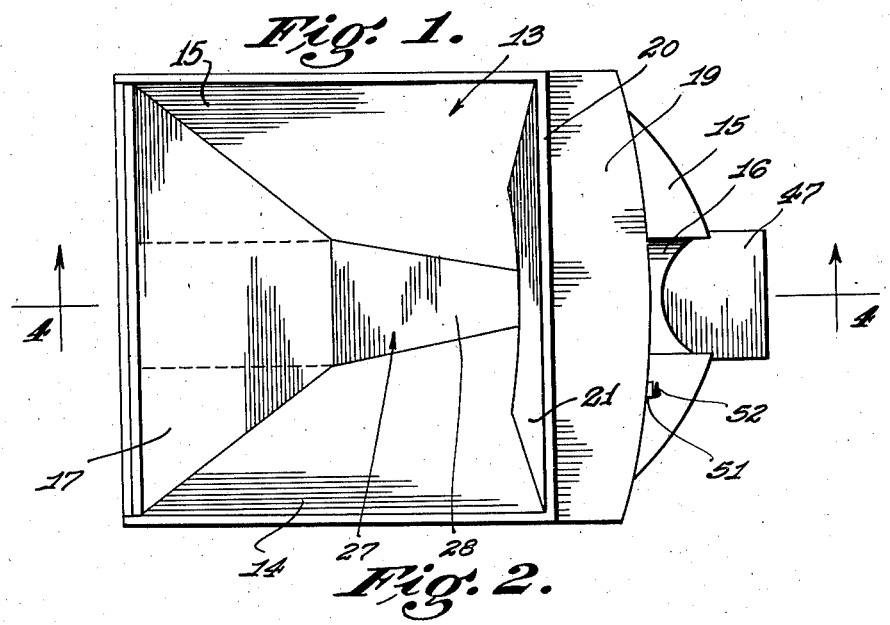
Inventor
J. HACKWORTH
By Lacey & Lacey, Attorneys July 14, 1942.   J. HACKWORTH   2,289,705
DISPENSING AND WEIGHING MACHINE
Filed Nov. 13, 1939   2 Sheets-Sheet 2

Inventor
J. HACKWORTH

By Lacey & Lacey, Attorneys

Patented July 14, 1942

2,289,705

UNITED STATES PATENT OFFICE 2,289,705

DISPENSING AND WEIGHING MACHINE

Jesse Hackworth, Ironton, Ohio, assignor of one-fourth to George C. Polley and Charles Mahl, Ironton, Ohio Application November 13, 1939, Serial No. 304,237

7 Claims. (Cl. 221—146)

This invention relates to an improved dispensing and weighing machine and seeks, among other objects, to provide a device of this character which will be capable of dispensing fruits or vegetables in a highly efficient manner and, also, weighing the goods dispensed so that a separate weighing operation will not be required.

A further object of the invention is to provide a dispensing and weighing machine wherein means are employed for shifting the fruits or vegetables to insure free flow from the hopper of the machine.

A further object of the invention is to provide a machine of this nature wherein the weighing apparatus employed is characterized by the utmost efficiency and simplicity.

As a still further object the invention seeks to provide a dispensing and weighing machine employing means for limiting accidental discharge of the fruits or vegetables within the hopper.

And the invention has as still another object to provide a machine of this character wherein the weighing apparatus employs a scale for indicating the weight of the goods dispensed from the hopper so that, after a predetermined amount of the contents of the hopper has been discharged, as indicated on the scale of the weighing apparatus, flow may be stopped.

Other objects of the invention will become apparent during the course of the following description.

In the accompanying drawings forming a part of this application:

Figure 1 is a top plan view of the machine.

Figure 2 is a side view.

Figure 3:
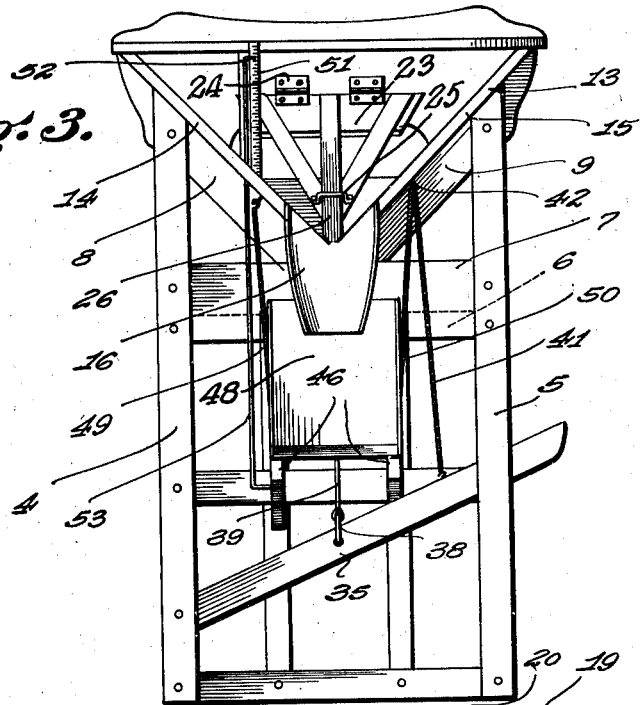
Figure 3 is a front view.
Figure 4:
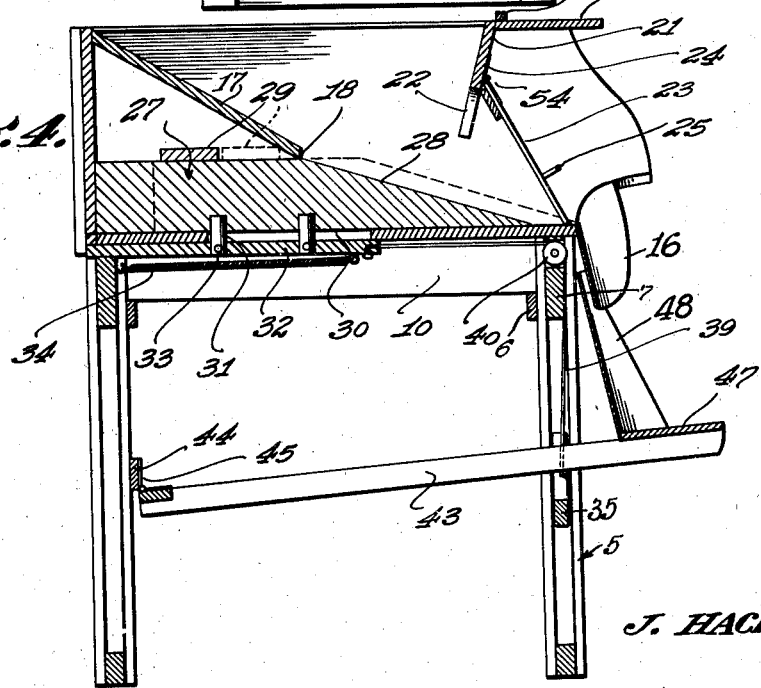
Figure 4 is a longitudinal sectional view on the line 4—4 of Figure 1, looking in the direction indicated by the arrows.

Referring now more particularly to the accompanying drawings, wherein like numerals of reference designate like parts throughout the several views, the numeral 1 indicates, in general, the frame of my improved dispensing and weighing machine. The frame 1 includes front and rear supports 2 and 3, said supports each including, as best seen in Figure 3, vertical legs 4 and 5 and braces 6 and 7. The upper ends of the supports 2 and 3 are provided with beams 8 and 9 arranged in V-form. The supports 2 and 3 are, as best seen in Figures 2 and 4, arranged in parallel spaced relation and are connected by horizontal beams 10. As shown at 11 in Figure 2, shelves are mounted to extend longitudinally between the front and rear supports 2 and 3. Shelves 12, mounted on said supports 2 and 3, above the shelves 11, are also employed. The shelves 11 and 12 provide means for supporting and displaying canned goods or the like in a store.

Mounted on the supports 2 and 3 on the frame 1, extending longitudinally thereof, is a substantially V-shaped hopper 13. The hopper includes side walls 14 and 15 which are adapted to overlie the beams 8 and 9 of the supports 2 and 3. At the corresponding forward ends of the walls 14 and 15 of the hopper, and at the point of meeting of said walls, there is provided a pouring spout 16 which may be of sheet metal or other suitable material. An inclined wall 17 is mounted within the hopper and terminates short of the bottom of the hopper to form an opening 18.

A shelf 19 extends across the front of the hopper and has its opposite ends connected to the corresponding upper end portions of the walls 14 and 15 of said hopper. The shelf 19 has an upstanding retaining flange 20 serving to prevent displacement of articles on the shelf. An apron 21 is mounted on the shelf and extends downwardly and is inclined rearwardly, within the hopper, said apron being formed with an arcuate lower edge 22. A gate 23 of substantially triangular outline is connected to the front face of the apron 22, near its lower end, by hinges 24. A handle 25 is provided for the gate and permits convenient lifting of the gate. As seen in Figure 3, the gate is provided with a separator finger 26 which has a V-shaped point adapted to lie normally in the crotch defined by the meeting walls 14 and 15 of the hopper. If desired, the shelf 19 may be provided with a hook on its under surface, said hook being engageable with the handle 25 for retaining the gate in open position when large quantities of the contents of the hopper are being dispensed therefrom.

Slidably mounted within the hopper in the opening 18, is a feeder block 27, said feeder block being of substantially triangular cross section and having a forwardly inclined front wall 28. The block slides lengthwise along the bottom of the hopper with its underside engageable with the meeting end portions of the walls 14 and 15. A stop block 29 is mounted on top of the feeder block 27 and is engageable with a portion of the under surface of the inclined wall 17 for limiting forward movement of said block 27. The hopper is formed, at the junction of the walls 8 and 9, and substantially medially, longitudinally of said hopper, with a slot 30 through which extend actuating pins 31, which pins fit in sockets in the under surface of the feeder block. The actuating pins have their lower ends mounted in an actuating bar 32, which bar is slidable beneath the hopper. Fastener members 33 extend through the actuating pins and firmly anchor said pins to the bar. Retractile springs 34 are connected between the forward end of the bar 32 and the horizontal bar 6 of the rear support 3, said springs normally urging the bar 32, with the block 27 connected therewith, to retracted position, in which position the inclined wall 28 will be substantially in alinement with the upper surface of the wall 17. It should be understood that as many springs as are necessary may be employed.

In order to shift the actuating bar forwardly against the tension of the springs 34, for shifting the feeder block forwardly and causing movement of the contents of the hopper toward the spout 16, I provide the following mechanism. A foot operated lever 35 has one end pivotally mounted between the members of the leg 4 of the support 2, said members being designated, for the purpose of convenience, as 36 and 37. The lever 35 extends laterally of the support 2 and between the members of the vertical leg 5 of said support, said lever projecting past said vertical leg to form a foot pedal. A substantially U-shaped clip 38 is mounted on the lever 35 substantially medially of its length. A cable 39 connects the clip with the forward end of the actuating bar 32, said cable being trained about a pulley 40 mounted in an opening in the horizontal bar 6. A spring 41 forms a connection between the lever 35 and a hook 42 on the wall 15 of the hopper 13, said spring 41 normally urging the free end of the foot operated lever 35 to elevated or inoperative position. It will now be understood that depression of the foot operated lever 35 will cause the cable 39 to be drawn through the pulley 40 for shifting the actuating bar forwardly and, thus, shifting the feeder block forwardly within the hopper. The pins 31 will, of course, engage the ends of the slot 30 for limiting movement of the bar 32 and block 27.

The mechanism so far described relates entirely to the dispensing feature of the machine. There will now be described the weighing apparatus which is associated with the machine and which is adapted to operate in conjunction therewith.

The weighing apparatus includes a beam 43 which extends longitudinally of the frame 1 and is connected to a horizontal bar 44 mounted on the support 3 by a hinge 45. The beam 43 extends forwardly beneath the horizontal bars 6 and 7 of the front support 2 and, of course, between the vertical legs 4 and 5. The beam 43, as clearly seen in Figure 3, includes parallel arms 46, and mounted on said arms at their corresponding ends, is a weighing platform 47 having a shield 48 substantially U-shaped in cross section, rising upwardly and rearwardly therefrom, said shield being preferably formed from sheet metal and said platform and shield extending between the arms. Springs 49 and 50 are connected between the forward end of the beam 43 and hooks on the walls 14 and 15 of the hopper 13. The springs 49 and 50 normally urge the beam 43, with the platform and shield thereon, upwardly, the shield being disposed with its upper end portion behind the pouring spout 16.

A scale bar 51 is mounted vertically between the under surface of the shelf 19 and the inner surface of the wall 14 of the hopper, said scale bar being graduated in pounds and fractions thereof. A scale pointer is shown at 52 and is mounted to move vertically over the face of the scale bar 51, the pointer being connected by a rod 53 with one of the arms 46.

The operation of the invention will be obvious from the foregoing description but it is thought that a brief statement will not be out of place. Fruit or vegetables, such as apples or potatoes, to be dispensed, are placed in the hopper 13. The gate 23 is allowed to remain closed so that there will be no accidental discharge from the hopper. Let it be assumed that a purchaser desires a certain amount of fruit or vegetables contained in the hopper. The operator has only to place a sack or other container on the platform 47 and against the shield 48, the bag or other container being disposed so that the spout 16 will be partially enclosed by the upper end of said bag. The gate is then opened for permitting the contents of the hopper to be dispensed into the bag. Shifting of the foot operated lever 35, with consequent shifting of the feeder block, as heretofore described, will keep a portion of the contents of the hopper moving toward the pouring spout so that there will be no danger of stoppage of flow. As the contents of the hopper pass into the bag in increased amount, the beam 43 will be moved downwardly against the tension of the springs 49 and 50. After the contents of the hopper have been dispensed to the extent that a predetermined weight of said contents is contained in the bag on the platform as indicated by the pointer 52 on the scale 51, it is only necessary to lower the gate 23 for stopping the flow. If it should happen that the amount is still inadequate and that two or three more apples, potatoes, or the like, are needed to complete the required weight, it is only necessary for the operator to engage the foot operated lever 35 for shifting the feeder block forwardly. Said block will cooperate with the separator finger 26 for feeding the vegetable or fruit to the pouring spout one by one until the desired weight has been attained. More specifically, the lower end of the wall 28 will engage a single apple, potato or the like and will force it against the inner surface of the finger 26. As the block moves forwardly the gate will be moved outwardly to the extent that the apple or the like will be permitted to pass to the trough and into the bag. As soon as the unit of fruit or the like has passed the gate, the gate will snap back under the tension of the spring contained in the hinge 24, said spring being shown at 54, for preventing further discharge from the hopper until the lever has been raised and the block retracted. It is believed that the operation of my improved dispensing and weighing machine will now be fully understood.

Having thus described the invention, what I claim is:

1. In a machine of the class described, a frame having supports, a hopper carried by the supports, a discharge spout connected with the hopper, a feeder block slidably mounted for longitudinal movement within the hopper, pins engaging the bottom of the feeder block, an actuating bar to which the pins are connected, an operating lever carried by one of the supports, means operatively connecting the operating lever with the actuating bar, and means connected with the actuating bar for normally retaining said actuating bar and feeder block in retracted position, said operating lever being engageable for advancing the feeder block and facilitating the dispensing of articles in the hopper therefrom through the discharge spout.

2. In a machine of the class described, a frame, a hopper mounted on said frame and provided with a discharge spout, said hopper including inclined side walls and an inclined rear wall, said inclined rear wall being disposed between the first-mentioned walls and terminating short of the junction of the side walls to form an opening, a feeder block slidably mounted for longitudinal movement within the hopper at said opening, a spring pressed gate pivotally mounted on the frame at said discharge spout and coacting with the feeder block for controlling the flow of articles from said hopper, and means operatively connected with the feeder block for shifting said block and maintaining movement of the articles within the hopper whereby said articles will be discharged at said spout.

3. In a machine of the class described, a frame, a hopper mounted on the frame and having converging side walls and a discharge spout, an inclined rear wall mounted in the hopper between the first-mentioned walls, an apron, a spring pressed gate pivotally mounted on the apron and provided with a finger operating within the hopper at said discharge spout, a feeder block slidably mounted for longitudinal movement within the hopper and having an inclined wall, and means mounted on the frame and connected with the feeder block for shifting said feeder block to maintain a portion of the contents of the hopper in motion toward the discharge spout when the gate is open, said gate cooperating with the inclined wall of the feeder block for discharging individual units of the contents of the hopper beneath said finger.

4. In a machine of the class described, a frame, a hopper supported on the frame and provided with a discharge spout, a feeder block slidably mounted for longitudinal movement within the hopper and having its lower surface provided with sockets, an actuating bar, pins carried by the actuating bar and fitting within the sockets, a spring connected with the actuating bar for normally holding the feeder block in retracted position, a spring pressed gate pivotally mounted on the hopper and provided with a depending finger disposed at the discharge spout and coacting with the feeder block, and an operating lever connected with the actuating bar for moving the feeder block in the direction of said finger.

5. In a machine of the class described, a frame, a hopper mounted on the frame and provided with an inclined rear wall spaced from the bottom of the hopper, a discharge spout at the forward end of the hopper, a feeder block slidably mounted for longitudinal movement within the hopper beneath the rear inclined wall, an actuating bar operatively connected with the feeder block, a spring forming a connection between the actuating bar and frame for normally holding the feeder block in retracted position, a stop block secured to the feeder block and engaging the rear inclined wall of the hopper for limiting the forward movement of the feeder block, and an operating lever operatively connected with the actuating bar for moving the feeder block in the direction of the discharge spout.

6. In a machine of the class described, a frame, a hopper mounted on the frame and provided with a discharge spout, an apron projecting within the hopper at said discharge spout, a yieldably supported gate pivotally mounted on the apron and provided with a depending finger inclined in the direction of the discharge spout, a feeder block slidably mounted for longitudinal movement within the hopper and having its forward portion inclined in the direction of the finger, an actuating bar connected with the feeder block, a spring forming a connection between the actuating bar and frame for normally holding the feeder block in retracted position, a foot operated lever pivotally mounted on the frame beneath the hopper, and a connection between the foot operated lever and said actuating bar for moving the feeder block in the direction of the finger against the tension of the spring.

7. In a machine of the class described, a supporting frame, a hopper substantially V-shaped in cross section mounted on the frame and provided at one end thereof with a discharge spout, a gate pivotally mounted for swinging movement at said discharge spout, a spring operatively connected with the gate for normally and yieldably holding the free end of the gate in cooperative relation with the bottom of the hopper, a feeder block slidably mounted for longitudinal movement within the hopper and having its forward end downwardly tapered for cooperation with the free end of the gate, an actuating device connected with the feeder block, a spring operatively connected with the actuating device for normally holding the feeder block in retracted position, an operating lever and a connection between the operating lever and actuating device for moving the feeder block in the direction of the gate whereby to cause the feeder block to force an article in the hopper against the free end of the gate to open the same and permit discharge of said article into the spout.

JESSE HACKWORTH.